United States Patent
Grove et al.

[11] 3,800,991
[45] Apr. 2, 1974

[54] METHOD OF AND AN APPARATUS FOR CUTTING GLASS

[75] Inventors: Robert H. Grove, Sarver; Robert P. De Torre, Pittsburgh; John R. Dahlberg, Jeannette, all of Pa.

[73] Assignee: PPG Industries, Inc., Pittsburgh, Pa.

[22] Filed: Apr. 10, 1972

[21] Appl. No.: 242,549

[52] U.S. Cl. .................. 225/2, 225/93.5, 225/96.5
[51] Int. Cl. ...... C03b 33/02, B26d 7/10, B26f 3/00
[58] Field of Search ........ 225/2, 93.5, 96.5; 65/112, 65/113

[56] References Cited
UNITED STATES PATENTS

| | | | |
|---|---|---|---|
| 2,378,091 | 6/1945 | McCormick, Jr. | 225/93.5 X |
| 3,344,968 | 10/1967 | Kovacik et al. | 225/93.5 X |
| 3,474,944 | 10/1969 | Chatelain et al. | 225/93.5 X |

*Primary Examiner*—Frank T. Yost
*Attorney, Agent, or Firm*—Thomas F. Shanahan

[57] ABSTRACT

Pieces of flat glass are cut to desired size without the necessity of grinding to size and polishing. Trims are removed from the piece in accordance with a procedure involving the creation of a subsurface discontinuity along an intended path of cut, followed by the application of surface heat along the discontinuity to increase tensile stresses within the piece along the intended path of cut. A bending moment is applied about the intended path of cut to propagate a fracture in the piece of glass. Light seaming of the top and bottom portions of the edges completes the preparation of the edges.

15 Claims, 8 Drawing Figures

METHOD OF AND AN APPARATUS FOR CUTTING GLASS

BACKGROUND OF THE INVENTION

1. Field of the Invention: This invention relates to a method of and apparatus for producing glass articles, and in particular, for the manufacture of architectural panels, furniture tops and other relatively thick glass articles, for example, in excess of 10 millimeters (especially in the range of 18 to 36 millimeters or above).

2. Description of the Prior Art: In the manufacture of architectural-glass panels and furniture tops of the kind indicated above, it has hitherto been common to obtain panels of a desired size by hand scoring and mechanical snapping of the edges of the glass to yield a piece somewhat greater in its dimensions than the final size desired, followed by the grinding of the cut edges of the piece to the desired size and the polishing of the ground edges. The grinding and polishing are time-consuming and costly operations, but they have hitherto been considered necessary, particularly in cutting glass sheets of substantial thickness.

It is important that architectural panels exhibit adequate edge strength. When tested in accordance with the conventional beam-loading test, the ground-and-polished edges of a 4-meter by 8-meter sheet, approximately 18 millimeters thick, produced by a process including the steps of conventional scoring, snapping, grinding and polishing, exhibit strength values such as about 4.6 to 4.9 kilograms per square centimeter. Panels exhibiting values substantially lower than about 4 kilograms per square centimeter are noticeably more susceptible to breakage.

U.S. application Ser. No. 57,574, filed July 23, 1970, and U.S. application Ser. No. 68,735, filed Sept. 1, 1970, both by Robert P. DeTorre, disclose a trimming procedure that involves the application of a surface deep score under relatively high pressure by a large-diameter, blunt scoring wheel, followed by the propagation of the score into a fracture and a light seaming operation on the top and bottom portions of the edges of the glass so cut.

SUMMARY OF THE INVENTION

As used in this application, the terms "subsurface crack" and "subsurface score" refer to a discontinuity such as a crack or score, respectively, that is within the thickness of the glass and does not extend to a major surface of the glass. The term "subsurface crack" refers to a discontinuity substantially without serrations in the glass. The term "subsurface score" refers to a discontinuity with serrations in the glass. The term "subsurface discontinuity" includes "subsurface cracks" and "subsurface scores".

According to the present invention, flat glass is cut along an intended path of cut by producing a discontinuity in the glass along the path, at least a substantial portion of which, along its length, is spaced from the major surfaces of the glass. Thermal energy is then concentrated on one of the surfaces to create a thermal gradient through the thickness of the glass along the intended path of cut to increase tensile stresses in the glass. A bending moment is applied about the intended path of cut to sever the glass. Light seaming removes sharp corners between the cut edge and each of the major surfaces.

The apparatus for performing the above-mentioned process may consist of a subsurface wheel to produce the subsurface discontinuity, an infrared line heater to increase the tensile stresses within the glass, a suitable cut-running apparatus to apply the bending moment about the intended path of cut, and a conventional seaming apparatus.

The subsurface wheel may consist of a large-diameter scoring wheel, such as, for example, at least approximately 12 millimeters, and preferably between approximately 19 and 100 millimeters, in diameter, having a blunt cutting angle, such as, for example, between approximately 155° and 170°. The wheel is urged against a major surface of the glass at high forces, such as, for example, approximately 80 kilograms to approximately 460 kilograms, and even greater.

A suitable heater is Model 5215 Line Heater, sold by Research, Inc., of Minneapolis, Minnesota. This heater is designed to concentrate high radiant flux energy on a target line at the external focal axis of an elliptical reflector. The line is approximately the width of a thermal source at the internal focal axis of the elliptical reflector. A tungsten-filament tubular quartz lamp is utilized as the source to produce a high temperature (4,000° to 5,400° F.) heat flux which is directed and focused by the elliptical reflector on the external focal axis.

The remainder of the apparatus may comprise a conventional cut-running apparatus to apply a bending moment about the intended path of cut and a conventional hand-held belt sander for seaming the upper and bottom portions of the cut edges of the glass.

It is well known that the easiest cuts to complete are cuts that bisect a piece of glass. Similarly, the most difficult cuts to complete are narrow trims. This is because of the stresses in the glass at its outer portions. U.S. application Ser. No. 242,511, entitled SUBSURFACE CRACKS, and filed by Fred M. Ernsberger and Charles M. Hollabaugh on an even date with the instant application, and U.S. application Ser. No. 242,510, entitled SUBSURFACE SCORES, filed by Robert P. DeTorre on an even date with the instant application, disclose methods of cutting glass using subsurface discontinuities. While the cut edges produced by these methods are generally of a high quality, trims that are not within the center third of the piece of glass often require grinding and polishing. The present invention produces cut edges of a quality that is equal to the cut edges produced by the methods disclosed in the above-mentioned applications. However, trims as narrow as 8 to 10 times the thickness of the glass may be removed leaving high quality edges without grinding and polishing.

It is an object of the present invention to produce cut edges that are smooth, strong, staight, pristine and perpendicular to the major surfaces of the piece of glass.

It is a further object of the present invention to produce such edges while avoiding the use of grinding and polishing.

It is a further object of the present invention to provide a method and an apparatus for cutting all glass, and in particular, glass in excess of approximately 10 millimeters in thickness by a relatively uncomplicated procedure.

It is a further object of the present invention to produce cut edges that are at least equal in quality to those produced by surface deep scoring, with a lesser amount of seaming.

It is a further object of the present invention to produce cut edges that are at least equal in quality to those produced by subsurface discontinuities without any thermal assist, but on narrow trims.

It is a further object of the present invention to find a practical means for generating a continuous discontinuity that will weaken a sheet of flat glass to the extent necessary so that it may be severed without incurring surface crushing or edge damage.

It is a further object of the present invention to produce a high quality cut edge at relatively high speeds on relatively narrow trims.

DESCRIPTION OF THE DRAWINGS

A complete understanding of the following invention may be obtained from the foregoing and following description thereof, taken together with the appended drawings, in which.

DESCRIPTION OF THE PREFERRED EMBODIMENT

Figure 1:
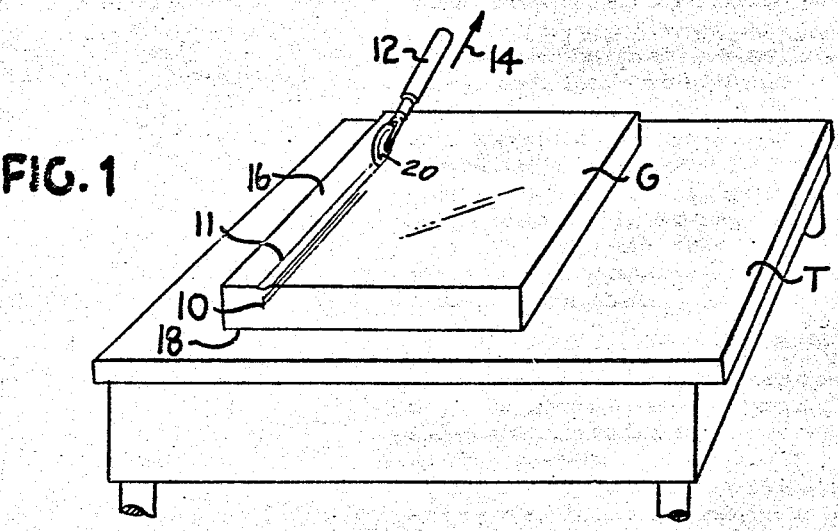
FIG. 1 is a diagrammatic view of a scoring apparatus applying a subsurface discontinuity to a piece of flat glass.

Referring to FIG. 1, an apparatus 12 is shown applying a subsurface discontinuity 10 to a piece of glass G along an intended path of cut and in a direction 14 that is substantially parallel to top major surface 16 and bottom major surface 18, while the glass is supported on a table T. At least a substantial portion of discontinuity 10 is spaced from top surface 16 and bottom surface 18 along the length of the discontinuity 10. Apparatus 12 is illustrated with a scoring or cutting wheel 20, but a scoring or cutting wheel 20' may also be used. As the apparatus moves in the direction of arrow 14, a permanent indentation 11, approximately 0.015 millimeter wide by approximately 0.001 millimeter deep is created above the discontinuity 10 along the intended path of cut. For the sake of clarity, the size of subsurface discontinuity 10 and indentation 11 have been exaggerated in the drawings.

One skilled in the art will appreciate that it is possible to keep apparatus 12 stationary and move glass G by any suitable conveyor means, such as powered rollers (not shown). There are many commercially available devices for housing a scoring wheel. It is well known, for example, to supply the necessary scoring pressure to a cutting wheel by means of a fluid pressure such as air or hydraulic fluid. Further, U.S. application Ser. No. 128,384, filed on Mar. 26, 1971, by David A. Bier, suggests that a cutting wheel may be actuated by a constant-reluctance motor means. Any suitable means may be used to supply the load to scoring wheel 20 or scoring wheel 20'.

Figure 2:
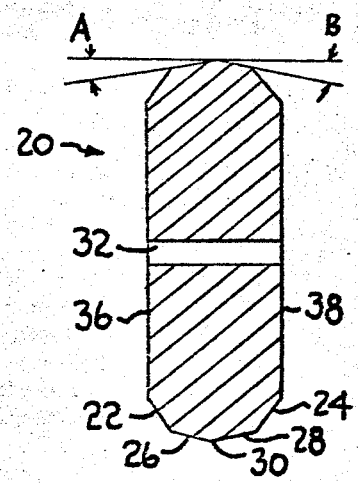
FIG. 2 is a vertical cross-sectional view of a cutting wheel used to produce subsurface scores.

Referring to FIG. 2, there is shown a detailed view of a scoring or cutting wheel 20 made of tungsten carbide or other suitable material of hardness of about 7 or more on Mohs' scale and having a radius in excess of approximately 6 millimeters, and preferably within approximately 9 millimeters to approximately 100 millimeters. The base angle, i.e., the angle between the two surfaces 22 and 24, if extended, is about 120° and the angle between the surfaces 26 and 28 (hereafter referred to as the cutting angle) is between approximately 155° and approximately 170°, with approximately 165° providing optimum results. With cutting angles less than approximately 150°, defects such as spall and wing may occur. The term "spall" may be defined as a chip or flake out of the edge of the piece of glass. The term "wing" may be defined as a lateral crack on either side of a score line, projected outward under the glass surface by the action of a scoring tool. With cutting angles between approximately 150° and approximately 155°, surface deep scores are generally produced. If the cutting angle is greater than approximately 170°, it is extremely difficult to produce any score beneath the apex 30 of the wheel 20. If pressure is applied to a wheel 20 having a cutting angle greater than approximately 170°, until the glass fails, the failure will generally occur adjacent to the point where surface 22 meets surface 26, or surface 24 meets surface 28.

The wheel 20 is shown with a central axle hole 32 which functions as a means for rotatably mounting said wheel on a shaft that is passed through the axle hole 32. Hole 32 may be, for example, 2.4 millimeters in diameter. With such a setup, there is a relatively large amount of friction between the cutting wheel and its holder, and for this reason, this type of wheel will hereinafter be referred to as a "high friction wheel." Wheel 20 may be, for example, 19 millimeters in diameter and urged into contact with a piece of glass G that is approximately 19 millimeters thick at a force of approximately 175 kilograms, to produce a subsurface deep score that starts approximately 0.01 millimeter, more or less, from the top surface 16 of glass G and extends for approximately 2 to 2.5 millimeters into the thickness of glass G. Scores so produced correspond to the intended location of the edge of the finished piece. To guide the scoring apparatus, a straightedge member may be secured to the glass G as is conventional in prior-art scoring.

Figure 3:
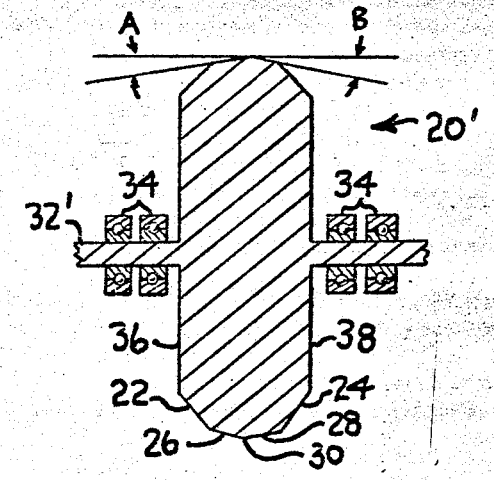
FIG. 3 is a vertical cross-sectional view of a cutting wheel used to produce subsurface cracks.

Referring to FIG. 3, there is shown a wheel 20' that is identical to wheel 20 except that wheel 20' has an integral shaft 32' instead of a hole 32. The shaft 32' may be mounted in bearings, such as ball bearings 34, to minimize, or even eliminate, friction between the wheel and its holder. This type of wheel will hereinafter be referred to as a "low friction wheel." U.S. application Ser. Nos. 242,511 and 242,510 set forth in detail the significant distinctions between a low friction wheel and a high friction wheel and these disclosures are therefore incorporated herein by reference.

Although a preferred embodiment of the present invention incorporates a cutting wheel or disc, other means will beocme apparent to carry out the present invention. For example, one may wish to construct a member that comprises a continuous chain forming a curved cutting edge rather than a wheel. It would still be necessary to maintain both the blunt cutting angles and the high pressures described herein. It is also necessary to maintain the effective radius of the continuous chain within the above-mentioned range. For example, a continuous chain could take the path of an oval, but the radius of the oval at the point of contact with the chain and the glass (effective radius) should be within the same range as the radius (or effective radius) of a cutting wheel.

It is important to note the importance of orienting the scoring wheels such that sides 36 and 38 are substantially perpendicular to the surface of the glass to be scored. The subsurface discontinuity generally extends in the same direction as the cutting wheel. Therefore, if the cutting wheel is not perpendicular to the glass surface, the resultant subsurface discontinuity will not be perpendicular. Referring to FIGS. 2 and 3, angles A and B indicate the angles between the cutting wheel and the glass surface 16. With a cutting wheel having a cutting angle of 165°, it is preferred that angle A and angle B be maintained at 7.5°.

Figure 4:
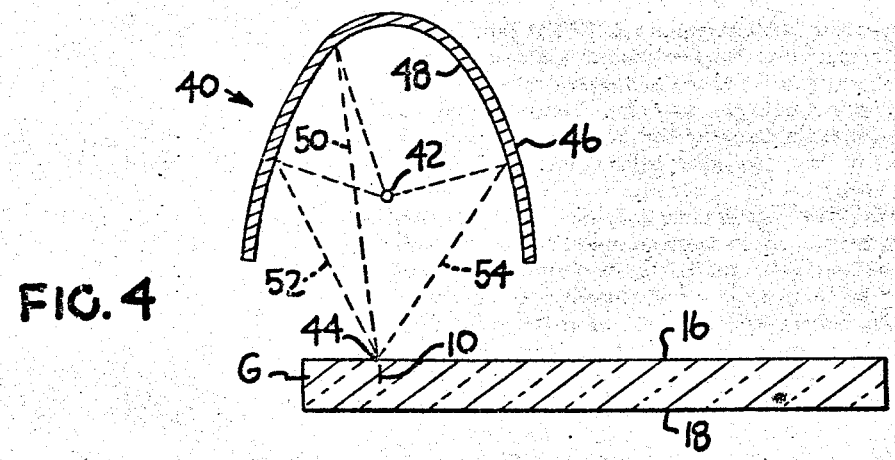
FIG. 4 is a vertical cross-sectional view of a heater creating a thermal gradient in the glass.

Referring to FIG. 4, there is shown a diagrammatic view of an infrared Line Heater 40 concentrating thermal energy on the top surface 16 of the piece of glass G to increase the tensile stresses within the glass. The drawing shows a line source 42 of thermal energy that preferably has an output of radiation in the range of 8,500 to 11,500 A. wavelength, and necessarily is capable of producing thermal radiations such that the heat applied is great enough to produce a stress in tension within the thickness of the glass G. Line Heater 40 includes an elliptically shaped hood 46 that has interiorly thereof, a highly polished and reflective surface 48. Source 42 is located at the internal focal axis of elliptically shaped hood 46. As can be seen from FIG. 4, the elliptical surface 48 is such that radiation emanating from the source 42, as indicated by lines 50, 52 and 54, is reflected and focused at an external focal axis 44. To obtain this result, it is essential that source 42 be located substantially at one of the foci of the ellipse that is generated by completing the surface 48, with the external focal axis 44 forming the other focus of said ellipse. U.S. application Ser. No. 66,940, filed Aug. 26, 1970, entitled METHOD OF SEVERING GLASS, by Terrence A. Dear, discloses details of the Line Heater 40 and further elaboration is deemed unnecessary.

It is significant to note that in accordance with the present invention, the glass surface is heated until it reaches a temperature of from approximately 100° F. to approximately 130° F. This is substantially less than the 200° F. temperature that is necessary for the thermal scoring suggested in U.S. application Ser. No. 66,940. The present invention heats the top major surface 16 of glass G to create a temperature gradient throughout the piece of glass G. The temperature of top major surface 16 may be, for example, 125° F., while the temperature of the bottom major surface 18 may be, for example, 70° F. This temperature gradient creates a stress profile in the glass that is similar to the stress profile that one obtains in the thermal scoring process taught in the above-mentioned Dear application. However, in the present invention, tensile stresses are created that are of a lesser magnitude than those necessary in thermal scoring.

Figure 5:
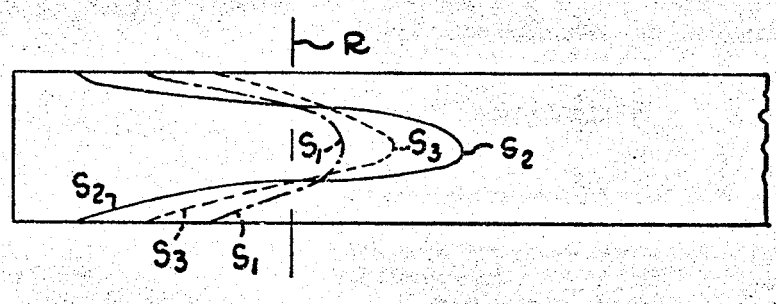
FIG. 5 is a view of a piece of glass illustrating a stress profile of normal flat glass, a stress profile of thermally scored flat glass, and a stress profile of a piece of glass that has been heated in accordance with the present invention.

Referring to FIG. 5, there is shown a diagram illustrating three separate stress profiles within a piece of glass. An imaginary reference line R indicates zero stress. Everything to the right of reference line R indicates tension and everything to the left of reference line R indicates compression. Curve $S_1$ shows the stresses in a piece of float glass before heat is applied. With such a condition, the surfaces of the piece are in compression at about 350 to 425 grams per square millimeter, and the center of the piece is in tension at about 210 grams per square millimeter. If the piece of glass is heated to create a thermal score, a stress profile such as $S_2$ will result along the intended path of cut. In this case, the surface compression and the center tension increase, with the center tension being about 575 grams per square millimeter. This result is achieved when the temperature of the top major surface of the glass is approximately 200° F. In accordance with the present invention, a stress profile such as $S_3$ will result along the intended path of cut. Here the top surface of the glass is heated to approximately 100° to 130° F. so that the center tension is increased only to approximately 425 grams per square millimeter to aid a subsurface discontinuity in guiding a fracture.

The present invention may be distinguished from the thermal scoring techniques suggested in U.S. application Ser. No. 66,940, in that the present invention does not create tensile stresses as high as those created with thermal scoring, since the present invention utilizes a subsurface discontinuity, and not a buildup of stresses, to guide a fracture. This is very significant when one considers non-bisecting cuts or trims. With the thermal scoring techniques taught in U.S. application Ser. No. 66,940, "banana edges" are obtained in non-bisecting cuts, but with the cutting techniques of the present invention, "banana edges" are avoided because the subsurface discontinuity guides the fracture.

With the cutting techniques involving subsurface discontinuities, as taught by either Ernsberger and Hollabaugh, or DeTorre, grinding and polishing is usually necessary on attempts to cut a piece of glass along a path that is not within the center one-third of the piece. The present invention is an improvement over these techniques in that it assists the subsurface discontinuity by applying heat along the discontinuity to create tensile stresses within the glass that help provide high quality edges, even on trim cuts.

In accordance with the present invention, it is possible to create the necessary tensile stresses in the piece of glass either by holding the heater fixed or stationary with respect to the glass or by providing relative movement between the heater and the glass. For example, if a 61-centimeter Line Heater is fixed with respect to a piece of glass, and it radiates 39.4 watts per lineal centimeter to an external focus 44 which corresponds to an intended path of cut that is 25.4 centimeters from one side of the piece of glass that is 61 centimeters by 61 centimeters, the approximate times to create the necessary tensile stresses are as follows: for glass 25.4 millimeters thick, 10 seconds; for glass 19 millimeters thick, 8 seconds; for glass 13 millimeters thick, 6 seconds; for glass 8.5 millimeters thick, 4 seconds; for glass 6.5 millimeters thick, 3 seconds; and for glass 3 millimeters thick, 2 seconds. If the power increases to 78.8 watts per lineal centimeter, the times decrease to: 7 seconds for 25.4-millimeter thick glass; 5 seconds for 19-millimeter thick glass; 3 seconds for 13-millimeter thick glass; 2 seconds for 8.5-millimeter thick glass; 1.5 seconds for 6.5-millimeter thick glass; and 1 second for 3-millimeter thick glass. At higher levels of flux density (power per unit of energy concentrated at the external focus), less time is required.

When the tensile stresses are created while there is relative movement between the heater and the glass, such as either the heater or the glass (or both, where each moves at a different speed) moving into or out of the paper in FIG. 4, there is a certain maximum speed of traverse at which the Line Heater 40 or the glass G may be moved. Using a Line Heater that is 15 centimeters long at a rated power of 1,200 watts to create the tensile stresses in a piece of 61-centimeter glass along a path that is 25.4 centimeters from one side of the piece, maximum scan speeds are approximately: 46 centimeters per minute for glass 25.4 millimeters thick; 64 centimeters per minute for glass 19 millimeters thick; 98 centimeters per minute for glass 12.7 millimeters thick; and 137 centimeters per minute for glass 6.35 millimeters thick.

It should be understood that while the invention has thus far been described as including a Line Heater to alter the stress profile in a piece of glass, it is not limited to such. Any thermal source that is capable of concentrating thermal energy along a narrow path that is not more than approximately 6.4 millimeters in width to create a tensile stress of approximately 425 grams per square millimeter within the glass will be suitable. For example, spot heaters (such as the one disclosed in the above-mentioned Dear application), hot air heaters (such as the in-line array disclosed in U.S. application Ser. No. 72,354), and lasers, are capable of creating such stresses without damaging the surfaces of the glass or the cut edge.

Figure 6:
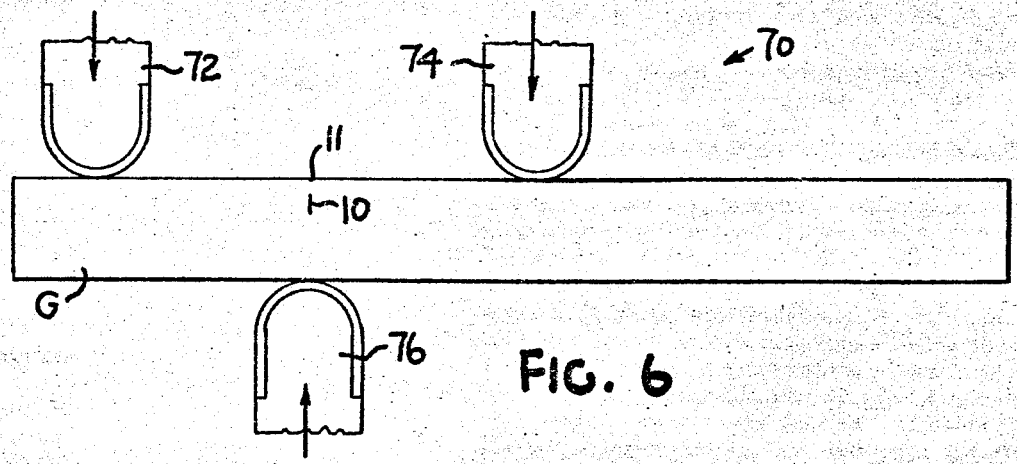
FIG. 6 is an elevation view of a snapping apparatus in position to apply a bending moment about the subsurface discontinuity.

Referring to FIG. 6, there is shown an elevation view of a snapping apparatus 70 in position to apply a bending moment about subsurface discontinuity 10. The apparatus may consist of two top anvils 72 and 74, and a bottom anvil 76. Glass G may be placed upon a table so that a portion of the subsurface discontinuity 10 overlaps the table. A bending moment may be applied at the end of the piece of glass G that overlaps the table to run a cut along the subsurface discontinuity 10. It is sometimes difficult, especially with pieces of glass that are relatively long and thick (such as 19-millimeter thick glass in excess of 3 meters in length), to run a cut in the manner described. Under such circumstances, a narrow member or plate, approximately 12 millimeters in width, may be placed between the glass and the table, directly beneath the subsurface discontinuity 10. This places the top surface of the piece of glass in tension along the discontinuity and reduces the energy necessary to run a cut along the entire length of the piece. Cut edges are produced that are smooth, strong, straight, pristine and perpendicular to the major surfaces of the piece.

Figure 7:
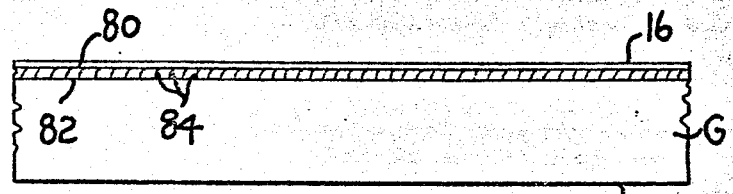
FIG. 7 is an elevational view of a cut edge that is produced by a method using a subsurface score.

After the glass has been snapped, there may be conducted an inspection to determine the quality of the cut edge that has been opened. In the inspection along the cut edge, looking perpendicularly to the cut edge, it is customary to see a pattern such as that indicated in FIGS. 7 and 8. FIG. 7 illustrates a cut edge that was severed with a subsurface score, using a high friction wheel. The top surface of the glass is there designated with the numeral 16 and the bottom surface designated with the numeral 18. A short distance below top surface 16 is seen a marking 80 and a marking 82 which indicate the extent of the subsurface score. The marking 80 is generally approximately 0.01 millimeter, more or less, from the top surface of the glass (this has been exaggerated in FIG. 7), and the marking 82 may be approximately 0.5 to 4 millimeters from the marking 80, or even more. A plurality of serrations 84 extend between markings 80 and 82. Note that each serration 84 approximates a quarter of a circle and markings 80 and 82 each approximate a straight line that is parallel to top surface 16 and bottom surface 18.

Figure 8:
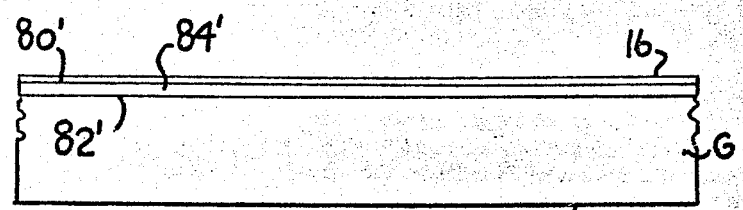
FIG. 8 is an elevation view of a cut edge of a piece of glass produced in accordance with the present invention using a subsurface discontinuity.

Referring to FIG. 8, there is shown a cut edge of a piece of glass G that was severed with a subsurface crack, using a low friction wheel, such as wheel 20'. The edge in FIG. 8 is similar to the one shown in FIG. 7, except for a smooth area 84' between marking 80' and marking 82'. Area 84' is substantially free of serrations because the circular defects that cause serrations are eliminated with subsurface cracks.

The inspection further comprises viewing the glass vertically, i.e., in a direction perpendicular to the major surfaces of the sheet of glass, to detect wing or undercut defects. A satisfactory cut exhibits no such defects, or, at the worst, ones so minor as to be removed during a subsequent seaming operation.

As a final step in the process of the present invention, there is conducted a finishing, such as light seaming, of the upper and bottom portions of the edges of the piece of glass so cut. This leaves a smooth edge with no evidence of markings or serrations. There may be used, for example, a hand-held belt sander using a belt 600 millimeters long by 75 millimeters wide. this is a conventional operation, and it does not require further elaboration nor explanation.

The result is that there is produced a finished piece of glass that compares favorably in its edge strength to similar pieces produced by the prior-art method of rough cutting, mechanical snapping, grinding to size, and then polishing. Pieces of the present invention have edge strengths of approximately 4.4 to approximately 4.7 kilograms per square centimeter in the conventional beam-loading test, in comparison with strengths such as 4.6 to 4.9 kilograms per square centimeter for the prior-art ground-and-polished pieces. Either will meet specifications on customary glazing installations. In achieving the edge-strength values indicated above, the final limited seaming operation is important. Without the final seaming operation, the edge strength is on the order of 3.8 to 4.0 kilograms per square centimeter.

Referring to Table A, there is shown the ranges of force that may be applied to 165° cutting wheels of various diameters, and the depths of subsurface discontinuities that result. The table also indicates the approximate maximum speeds with which a high friction wheel and a low friction wheel may be advanced to insure that the discontinuity is subsurface.

TABLE A

| Wheel diameter, millimeters | Range of force, kilograms | Range of depth of subsurface discontinuity, millimeters | Maximum speed for producing subsurface score (centimeters/second) | Maximum speed for producing subsurface crack (meters/second) |
|---|---|---|---|---|
| 12.7 | 80–115 | 1.5–2.0 | 25 | 1 |
| 19 | 135–175 | 1.5–2.5 | 25 | 1 |
| 31 | 180–200 | 1.7–2.7 | 30 | 1.2 |
| 50 | 200–275 | 2.0–3.0 | 40 | 1.6 |
| 100 | 300–460 | 2.5–4.0 | 50 | 2.0 |

It is anticipated that the present invention may be used to cut edges other than straight edges. Further, bent or other forms of flat glass may also be cut as herein contemplated. In addition, the invention may also be practiced in cutting glass objects such as thick cylinders, rods and tubes.

While the invention has thus far been described in connection with cutting pieces of glass, it will be apparent to one skilled in the art that it is not limited to such. For example, the invention may be practiced in a wareroom to cut a continuous ribbon of glass, either longitudinally or transversely.

Having now fully disclosed the invention, what we claim is as follows:

1. A method of cutting flat glass along an intended path of cut comprising the steps of:
   producing a discontinuity in said glass extending substantially perpendicular to and along said path, at least a substantial portion of which, along its length, is spaced from the major surfaces of said glass,
   concentrating thermal energy on one of said surfaces to create a heat gradient through the thickness of the glass along said intended path of cut to increase tensile stresses in the glass, and
   applying a bending moment about said intended path of cut to sever said glass.

2. A method of cutting flat glass as defined in claim 1, wherein the discontinuity that is produced in said glass is a subsurface score.

3. A method of cutting flat glass as defined in claim 1, wherein the discontinuity that is produced in said glass is a subsurface crack.

4. A method of cutting flat glass as defined in claim 1, wherein the discontinuity is produced by a wheel having a cutting angle of from approximately 155° to approximately 170° and a diameter of at last approximately 12 millimeters.

5. A method of cutting flat glass as defined in claim 4, wherein said wheel is forced against said one of said surfaces at a force between approximately 40 and approximately 460 kilograms.

6. A method of cutting flat glass as defined in claim 4, wherein said wheel is forced against one of said surfaces at a force above approximately 80 kilograms.

7. A method of cutting flat glass as defined in claim 4, wherein said wheel is forced against said one of said surfaces at a force above approximately 80 kilograms.

8. A method of cutting flat glass as defined in claim 1, wherein the step of concentrating thermal energy comprises activating a thermal source and focusing radiant energy from said thermal source on said one of said surfaces by an elliptical reflector.

9. A method of cutting flat glass as defined in claim 1, wherein the step of concentrating thermal energy comprises activating an in-line array of hot gas heaters.

10. A method of cutting flat glass as defined in claim 8, wherein there is no movement between the heater and the glass when the thermal energy is concentrated on one of said surfaces.

11. A method of cutting flat glass as defined in claim 8, wherein there is relative movement between the heater and the glass when the thermal energy is concentrated on said one of said surfaces.

12. A method of cutting flat glass as defined in claim 9, wherein there is no movement between the heater and the glass when the thermal energy is concentrated on one of said surfaces.

13. A method of cutting flat glass as defined in claim 9, wherein there is relative movement between the heater and the glass when the thermal energy is concentrated on said one of said surfaces.

14. A method of cutting flat glass as defined in claim 8, wherein heat is concentrated on said one of said surfaces until said one of said surfaces is between approximately 105° F. and approximately 125° F.

15. A method of cutting flat glass as defined in claim 9, wherein heat is concentrated on said one of said surfaces until said one of said surfaces is between approximately 105° F. and approximately 125° F.

* * * * *

UNITED STATES PATENT OFFICE
CERTIFICATE OF CORRECTION

Patent No. 3,800,991  Dated  April 2, 1974

Inventor(s)  Robert H. Grove et al

It is certified that error appears in the above-identified patent and that said Letters Patent are hereby corrected as shown below:

Column 9, line 42, Claim 5, change "between" to ---of at least---.

Column 9, lines 42 and 43, Claim 5, delete "and approximately 460".

Column 10, lines 4 through 6, Claim 7, delete in its entirety.

On the cover sheet, after the abstract, "15 Claims" should read -- 14 Claims --.

Signed and sealed this 24th day of September 1974.

(SEAL)
Attest:

McCOY M. GIBSON JR.
Attesting Officer

C. MARSHALL DANN
Commissioner of Patents